United States Patent [19]

Wilcox

[11] Patent Number: 4,567,334
[45] Date of Patent: Jan. 28, 1986

[54] SUSPENDED COMBINED ELECTRIC CURRENT COLLECTION AND TRACTION SYSTEMS

[76] Inventor: Thomas W. Wilcox, "Delway", 1 Astley Dr., Whitley Bay, Tyne & Wear NE26 4AE, United Kingdom

[21] Appl. No.: 466,341
[22] PCT Filed: Jun. 8, 1982
[86] PCT No.: PCT/GB82/00169
  § 371 Date: Feb. 7, 1983
  § 102(e) Date: Feb. 7, 1983
[87] PCT Pub. No.: WO82/04422
  PCT Pub. Date: Dec. 23, 1982

[30] Foreign Application Priority Data

Jun. 9, 1981 [GB] United Kingdom ............... 8117654

[51] Int. Cl.⁴ .............................................. B60M 1/08
[52] U.S. Cl. ........................................ 191/21; 104/95; 104/107; 104/112; 104/165; 104/288; 105/29 R; 105/154; 174/41
[58] Field of Search .............. 104/95, 106, 107, 112, 104/165, 287, 288; 105/29 R, 148, 154; 191/33 R, 35, 40, 45 A, 50, 15, 20, 21, 22 DM, 23 A, 45 A; 174/41, 70 A

[56] References Cited

U.S. PATENT DOCUMENTS

| | | | |
|---|---|---|---|
| 1,912,782 | 6/1933 | McQuaide | 191/41 |
| 3,033,978 | 5/1962 | Van Dusen, Jr. | 191/41 X |
| 3,297,814 | 1/1967 | McClean et al. | 174/41 |
| 3,333,804 | 8/1967 | James | 174/41 X |
| 4,053,035 | 10/1977 | Uchiyama et al. | 104/112 X |
| 4,168,769 | 9/1979 | Wilcox | 191/21 |

FOREIGN PATENT DOCUMENTS

| | | | |
|---|---|---|---|
| 137682 | 10/1979 | Japan | 174/41 |
| 1555033 | 11/1979 | United Kingdom . | |

Primary Examiner—Randolph A. Reese
Assistant Examiner—David F. Hubbuch
Attorney, Agent, or Firm—McAulay, Fields, Fisher, Goldstein & Nissen

[57] ABSTRACT

A track for a suspended combined electric current collection and traction system including a base (22) and a resilient shield (26, 28) together defining an elongate space divided into two halves by a resilient beam (32), each of which contains a conductor (33). Spaced contact members in the form of bars (34) forming a rack on each side of the track or two rows of Z shaped contacts (82) extend through the shield and are normally spaced from the conductors. Embedded in the base are two parallel flexible metallic cables (40; 70) connected together by connectors (42; 74) by which the track may be suspended. In use, the reaction wheels (60) of a locomotive engage the tops of the cables (40; 70) thus drawing a current pick-up member (52; 86) into contact with the contact segments pressing them against the conductors (33) to pass electric current to an electric motor. A drive member which may be constituted by current pick-up pinions (52) engaging the racks or a drive wheel (88) engaging the shield between the Z shaped contacts (82) propels the locomotive along the track.

10 Claims, 3 Drawing Figures

SUSPENDED COMBINED ELECTRIC CURRENT COLLECTION AND TRACTION SYSTEMS

The invention relates to suspended combined electric current collection and traction systems and relates in particular to a track for such systems. The invention is concerned with that type of suspended current collection and traction system including a track having a base and a shield together defining a space accommodating at least one live conductor extending along the length of the track, a plurality of spaced contact segments extending through the shield and extending within the said space transverse to the length of the or each conductor and a resilient member serving to normally space the contact members away from the conductor or conductors, the track affording an external reaction surface, whereby, in use, a locomotive having one or more current pick-up members and one or more drive members may propel itself along the track with the or each current pick-up member engaging the contact members sequentially and pressing them into contact with the conductor or one of the conductors against the resilience of the resilient member to pass electric current to the locomotive which transmits tractive power to the or each drive member which is in contact with the reaction surface, the base affording an engagement surface for the engagement by reaction wheels carried by the locomotive to draw the or each current pick-up member into contact with the contact segments and the or each drive member into engagement with the reaction surface.

Such a construction is described and claimed in U.S. Pat. No. 4,168,769, and FIG. 1 of the accompanying drawings is a transverse section through one form of track described in this prior specification. In this prior construction the track is suspended from a beam 2 of T or I section to which it is secured by a plurality of dowel pins 4. In the center of the track is an inverted substantially T shaped web 6 of rubber, the head of which is slightly upturned and provided with a plurality of transversely extending holes, each of which receives a contact bar 8. The central web 6 is surrounded by a shield 10 which defines together with the web 6 two spaces, each of which contains a continuous conductor 12 extending along the length of the track. The contact bars 8 extend through the shield 10, and their projecting ends 14 form a rack on each side of the track. In use, a locomotive, which is not shown, having several pairs of reaction wheels and two or more driven current pick-up pinion wheels runs along the track with the pinion wheels being drawn into contact with the two racks by the engagement of the reaction wheels with the upper surfaces of the lower web of the beam 2. The bars 8 contact the conductors 12 and thus transmit current through the pinion wheels to the locomotive motor which rotates the pinion wheels and propels the locomotive along the track.

Whilst fully practicable, this prior construction has a number of disadvantages, many of which are attributable to the necessity of having to provide a rigid beam, e.g. of steel, to carry the track and for the reaction wheels to run on. Thus the I beam is extremely heavy which necessitates the provision of substantial and thus expensive supports and the fact that the beam is rigid means that the track must of necessity be transported to the site where it is to be used in short sections which must be subsequently connected together.

Accordingly it is an object of the present invention to provide a track for a combined electric current collection and traction system of the type referred to above in which the problems of the known system are substantially avoided.

According to the present invention the base includes a flexible elongate reinforcing member extending along the length of the track and including securement means by which the track may be suspended.

The flexible reinforcing member preferably includes a metallic cable and more preferably comprises two such cables extending side by side and at least partially embedded in the base.

In one embodiment of the invention the cables are of conventional stranded type. Whilst this is perfectly adequate for many applications it is found that such a cable may have inadequate longitudinal stiffness which can result in the track sagging unacceptably between the points at which it is supported. This stiffness can be increased by decreasing the winding pitch of the cables but this simultaneously decreases the flexibility of the entire track which is undesirable since it is required to be able to wind the track on a drum for transportation purposes.

Thus in a further embodiment of the invention the reinforcing member comprises two hollow segmental metal cables extending side by side along the length of the track and at least partially embedded in the base, each cable comprising a plurality of interlocking helical segments affording interlocking projections and recesses which permit relative peripheral movement and thus longitudinal bending of the cables. Such segmental cables have longitudinal flexibility but substantially enhanced longitudinal stiffness.

Thus in accordance with the present invention the T or I section beam of the known construction is dispensed with, and its load bearing function is fulfilled by the flexible metallic cable or cables. This results in a construction which is considerably cheaper to manufacture and is considerably lighter. Transport of the track is facilitated not only by the reduction in weight but also, and more importantly, by the flexibility of the track which enables the entire track to be wound up on a drum. In addition, erection is made simpler by the fact that the track does not need to be secured either in the factory or on site to a relatively massive load bearing beam.

The flexible reinforcing member or members may be completely embedded in the base, in which case the engagement surface will be afforded by the upper surface of the base, optionally provided with a plastics or metallic facing. However, the engagement surface must be able to withstand the compressive force to which it is subjected and in the preferred embodiment the two cables are so situated that their upper surfaces are flush with, or proud of, the upper surface of the base and constitute the engagement surface.

The track preferably includes spaced connectors connecting the two cables together and constituting the securement means by which the track may be suspended.

In one embodiment the contact segments comprise one or more rows of Z shaped contacts, each row being associated with and adapted to contact a respective conductor, both limbs of each contact extending transverse to the length of the track and inside the shield and the other portion connecting the limbs extending outside the shield and adapted to be contacted by a current pick-up wheel on a locomotive, the shield affording a reaction surface adapted to be contacted by a drive wheel on the locomotive. Thus for two pole operation there are two conductors and two rows of contact segments each of which is contacted, in use, by a respective current pick-up wheel on a locomotive which propels itself along the track by exerting a tractive force on the reaction surface of the shield.

In a further embodiment the contact segments are constituted by contact bars extending through the shield transverse to its length, the ends of the bars constituting a rack on each side of the shield whereby, in use, a locomotive having two or more driving current pick-up pinions may propel itself along the track with the pinions engaging the reaction surface afforded by the two racks and pressing the contact bars into contact with the conductor or conductors against the resilience of the resilient member to pass electric current to the locomotive.

Preferably there are two conductors which may be of the same polarity, in which case the contact bars may be a single piece of metal, but are preferably of different polarity, in which case the contact rods are constructed so that there is no electrically conducting path between their two ends. The contact rods may pass through holes in the resilient member, but preferably they are situated in open-bottomed transverse slots in the resilient member and retained in position by the shield.

The resilient member may be constituted by the shield itself, but in the preferred embodiment it comprises a separate item of e.g. rubber or elastomeric material. In the preferred embodiment the resilient member divides the space within the shield into two halves, each of which contains a conductor.

The invention also embraces a suspended combined current collection and traction system including such a track suspended in the air and a locomotive having one or more current pick-up members cooperating with the contact segments, one or more drive members cooperating with the reaction surface, an electric motor connected to the current pick-up members to be supplied with electric current by them and mechanically to drive the drive members and two or more reaction wheels engaging the engagement surface on the base.

The track may be suspended from a plurality of towers in the manner of a power transmission line, and the locomotive may then be used to convey people or materials through the air or to drag objects, such as tree trunks, along the ground.

Figure 1:
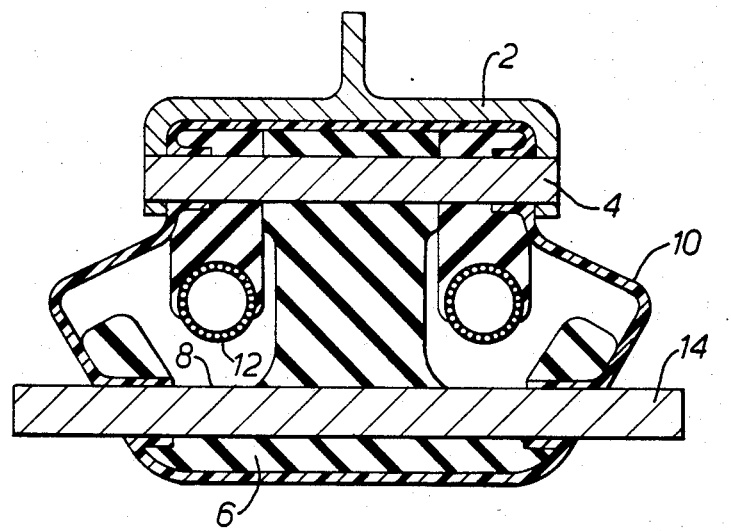
FIG. 1 is a cross sectional view of a prior art suspended combined electric current collection and traction system.
Figure 3:
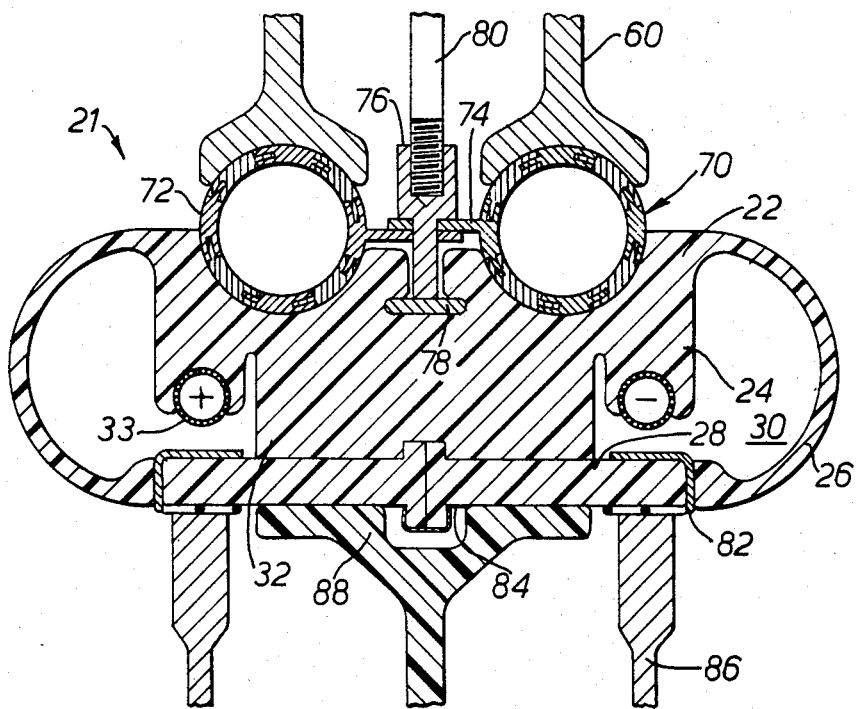
FIG. 3 is a sectional view of another embodient of the suspended combined electric current collection and traction system of the present invention.
Figure 2:
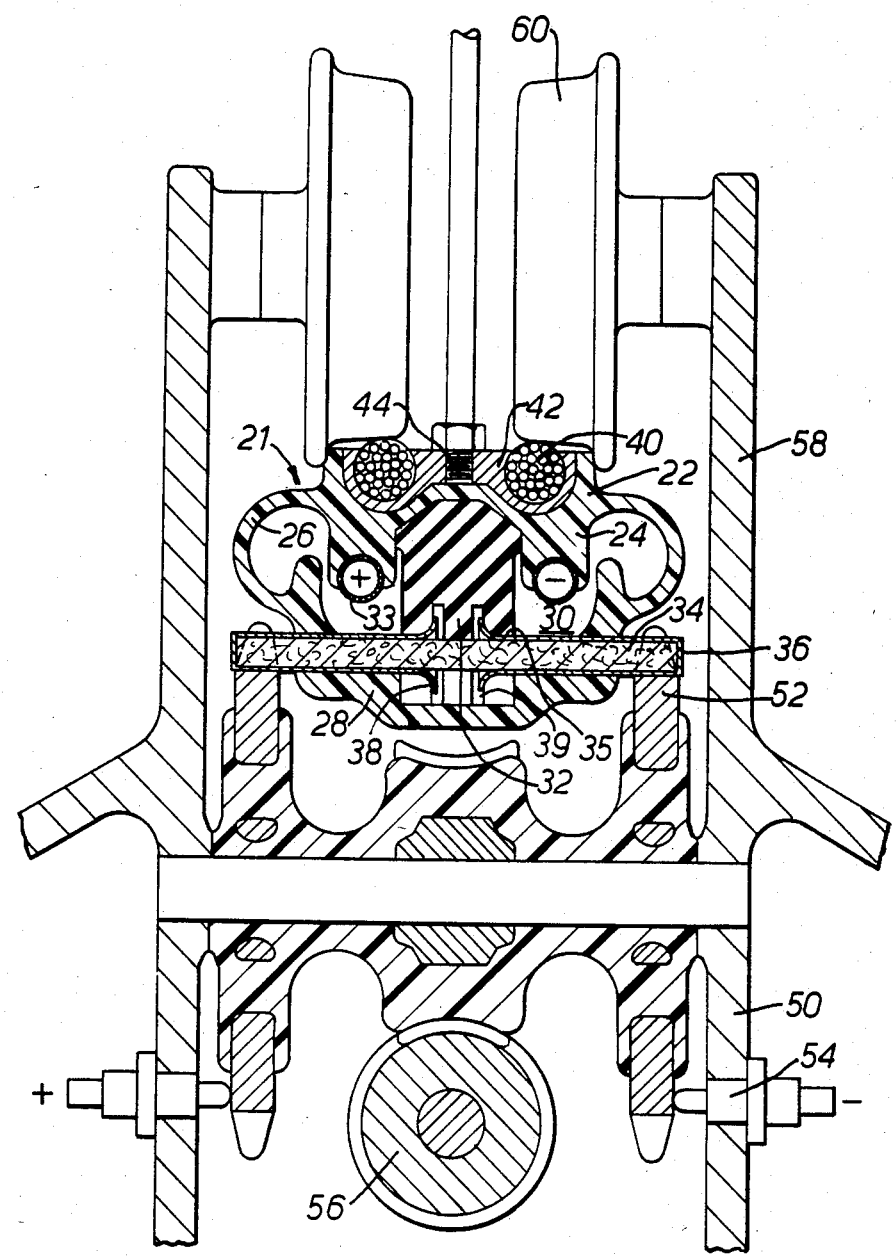
FIG. 2 is a sectional view of one embodiment of the suspended combined electric current collection and traction system.

Further features and details of the invention will be apparent from the following description of two specific embodiments of the invention which is given by way of example with reference to FIGS. 2 and 3 of the accompanying drawings which are transverse sections through two different constructions of track in accordance with the invention engaged by a locomotive.

The track, generally designated 21 comprises a base portion 22 of PVC or like flexible material integral with which are two depending ridges 24 extending parallel to each other along the length of the track. Integral with each side of the base portion is one end of a laterally bulbous side web 26, the other ends of which are integrally connected by a further web 28. The webs 26 and 28 together constitute a shield which together with the base defines an enclosed space which is divided into two halves 30 by a resilient rubber beam 32 which is held in contact with the underside of the base portion 22 by the web 28. Each half 30 of the internal space contains a continuously live conductor 33 secured to one of the ridges 24. The web 26 is provided with a plurality of regularly spaced transversely extending holes through each of which a contact bar 34 extends and the free ends of the contact bars form a pin rack on each side of the shield. The contact bars 34 pass through open-bottomed slots 35 in the rubber beam 32 and are retained there by the web 28.

The contact bars 34 are formed of fibre glass or other insulating material, and carry on each end a stainless steel sleeve 36, constituting contact members and a reaction surface, the inner end of which affords a peripheral flange 38 which is received in a longitudinally extending slot 39 formed in the walls of the open-bottomed slots 35 in the rubber beam. The contact bars are therefore restrained against vertical and horizontal movement by the web 26 and against movement in the direction of their length by the flanges 38 on the sleeves which are located in the longitudinal slots 39.

The two conductors 33 are of opposite polarity, and when the contact bars are pressed towards them are each contacted only by a respective one of the conductive sleeves 36.

Two standard steel cables 40 are embedded in the base portion 22 and extend parallel to each other and to the length of the track. The upper surfaces of the two cables are slightly proud of the upper surface of the base portion and constitutes an engagement surface along which, in use, the reaction wheels of the locomotive run. At regular intervals, of e.g. 1 meter, the two cables are connected by a steel clamp 42. The clamps afford an open-topped trough at each end and are merely crimped around the underside of the two cables. Each clamp is formed with a tapped hole 44, into which a bolt or threaded bar may be screwed by which, in use, the track is supported.

Thus in manufacture, the two cables are secured together by the clamps and the base portion and shield are continuously extruded around the cables, whilst forming the holes for receiving the contact bars, as a substantially flat symmetrical item broken at the midpoint of the web 28. The rubber beam is also continuously extruded and the transverse slots 35 and the longitudinal slots 39 are formed simultaneously. The rubber beam is placed in contact with the base portion and the contact bars are fitted through the holes in the shield. The two halves of the web 28 are placed together so that the contact bar enters the slots 35 in the rubber beam and are then welded or otherwise secured together.

The locomotive is substantially similar to that illustrated in FIG. 12 of the prior U.S. Pat. No. 4,168,769 referred to and has a housing 50 which carries two pairs of metallic pinion wheels 52 which constitute both current pick-up and drive members, one wheel of each pair engaging one of the racks afforded by the ends of the contact bars. The pinion wheels are electrically connected by two brush assemblies 54 to an electric motor (not shown), which is mechanically connected via a geared drive 56 to rotate the pinion wheels. On each side of the housing 50 there is an upwardly extending bracket 58, each of which carries on its inner side a reaction wheel 60 rotatable about a horizontal axis whose running surface is in engagement with the upper surface of a respective one of the steel cables 40.

In use, the reaction wheels run along the cables 40 and the pinion wheels engage the racks and draw them upwardly from the position shown in FIG. 2 against the resilience of the rubber beam to a position in which the two stainless steel sleeves 36 contact a respective one of the conductors 33, which are preferably hollow resilient tubular conductors. The bulbous shape of the side webs 26 permits the shield to deform resiliently without damage. Thus an electrical circuit is completed between the two conductors 33 via the two sleeves 36, the pinion wheels 52 and the locomotive motor which rotates the pinion wheels. The locomotive thus moves itself along the track depressing each contact bar in turn whilst the contact bars previously engaged return to the position shown in FIG. 2 under the action of the resilient force exerted by the locally compressed rubber beam 32. The reactive force exerted by the reaction wheels is transmitted through the steel cables 40, the rubber beam 32 and the contact bars 34 to the pinion wheels, and the steel clamps 42 by which the track is suspended resist any tendency there might be for the two cables to be forced apart.

As mentioned above, the flexible track wound on a drum may be taken to a site where it is required. After inserting bolts or the like in the holes 44 in some or all of the clamps 42, the track may be simply suspended between two or more towers (not shown) in a manner similar to a power transmission line. In the preferred embodiment the track is suspended by attaching a number of cables, e.g. 6, to the top of each tower and then attaching these cables to three of the clamps 42 on each side of each tower, thus ensuring that not all the load applied to a length of track will be transmitted through a single clamp. Thus the majority of the clamps need not be used for suspending the track, since the presence of the steel cables 40 enable it to support very considerable vertical loads which are transmitted to the towers by the tensile force acting along the length of the steel cables in the track which hangs in the manner of a catenary between adjacent towers. Naturally, if required, a cable may be suspended between adjacent towers and the track may then be suspended from the cable using every one of the clamps 40. After connection of a power supply to the conductors, the system is ready for use.

The construction illustrated in FIG. 3, in which the same reference numerals are used to designate similar components, differs from that illustrated in FIG. 2 in two important respects. Thus, whilst the construction of FIG. 2 includes two stranded metal cables in the base and contact members which both transmit electrical power to the locomotive and exert the reactive force to the tractive force exerted by the locomotive, the construction of FIG. 3 utilises rather more rigid segmental metal "cables" and the contact members play no part in the locomotive traction.

More specifically, the base 22 is provided with two spaced segmental stainless steel cables 70 each comprising a plurality, in this case eight, interfitting segments 72 which are of tongue and groove shape in transverse section and are helical in the direction of the length of the cables 70. Each segment 72, which may be a one-piece extrusion or formed from three separate plates welded together, engages two similar segments along its longitudinal edges with gaps (not shown) between the end of each tongue and the end of the groove accommodating it. Each cable has a plurality of lugs 74 spaced apart along its length, e.g. by 1 meter, welded to its side surface and provided with a hole. These lugs, which constitute securement means, overlap with their holes coincident and accommodating an anchor member 76 having a threaded hole at is upper end and a transversely extending flange 78 at its lower end. The lower end of the anchor member is received in a T shaped slot formed in the upper surface of the base 22. The threaded hole at the top of the anchor member receives a threaded bolt 80 or the like by which the track may be suspended in the manner described above.

Instead of the contact bars 34, this construction is provided with two parallel rows of Z shaped contact members 82. These are arranged in overlapping fashion with both limbs of each Z extending transverse to the length of the track in contact with the inner surface of the web 28 and the portion connecting the limbs of each Z extending in contact with the external surface of the web 28. The construction, arrangement and operation of these Z shaped contact members is described in U.S. Pat. No. 4,168,769, the disclosure of which is incorporated herein by reference, and therefore will not be described here in detail.

The substantially planar outer surface 82 of the web 28 between the two lines of Z shaped contacts constitutes a reaction surface which, in use, is engaged by one or more drive wheels 86 of a locomotive.

The manufacture of the track shown in FIG. 3 is generally similar to that of the track of FIG. 2 but the resilient beam 32 is extruded integrally with the base 22 which, in this case, is not extruded around the segmental cables. The cables 70 with the lugs 74 welded in place are embedded in the base and after extrusion the Z shaped contact segments are positioned in holes formed during or subsequent to the extrusion process or positioned in the manner of staples.

The track components can then be coiled onto drums, the bending of the cables 70 being translated into torsion of their individual segments 72 which is accommodated by closing up the gaps in the tongue and groove joints. When on site, the anchor members 76 are placed through the holes in the lugs 74 which are then welded together and their transverse flanges welded to them. Subsequently the lower portion of the anchor member is force fitted into the T shaped slot in the base to connect the cables to the rubber extrusion. After inserting the bolts 80, the track is suspended as before.

As before, the locomotive is provided with two reaction wheels 60 which run along the upper surfaces of the cables 70. However, instead of driven current pickup sprocket wheels, the locomotive has two current-collecting wheels 86 arranged to run along a respective row of Z shaped contacts contacting them sequentially and depressing them against the resilience of the beam 32 into contact with a respective conductor 33 thereby distorting them in torsion. The tractive power of the locomotive is transmitted to one or more drive wheels 86 contacting the reaction surface 84 thereby propelling the locomotive along the track. The spacing between the reaction wheels 60 and the current collecting wheel 86 and drive wheel 88 is such as to ensure that the Z shaped contacts reliably transmit electrical power to the locomotive and that the contact pressure between the reaction surface 84 and drive wheel 88 is sufficient to enable the locomotive to exert a very substantial tractive force sufficient to climb a gradient of e.g. 1 in 1.

It will be appreciated that the modification to the cables and the modification to the contact segments have no interaction and that it would be perfectly possible to provide constructions with segmental cables and contact bars forming pin racks or with stranded cables and Z shaped contact segments. It will be appreciated that the invention is also applicable to single pole or three phase operation by varying the number of rows of Z shaped segments or altering the construction of the contact bars appropriately.

A traction system in accordance with the invention has application in many fields, and in particular in those areas where transport is required but no roads or the like are available. The high tractive force which may be exerted by the locomotive by virtue of either the positive meshing of the pinion wheels with the racks or the very high contact pressure easily obtained between the drive wheel and the reaction surface results in a power to weight ratio very substantially higher than that obtained with conventional locomotives which rely on frictional forces limited by their weight for producing their tractive effort.

Thus a traction system in accordance with the invention finds particular application in forestry work, since it may be assembled rapidly with the destruction of a minimum number of trees. The locomotive is capable of ascending gradients of 1 in 1 and more, so the track may go straight up a steep mountain side either carrying or dragging a tree trunk or forestry equipment resulting in a considerable economy in energy and labour time as compared to the conventional system in which expensive forestry roads must be built zigzagging up the mountain with a gradient of rarely more than 1 in 10. In addition, the fact that the traction system is electrically driven enables electrical power to be tapped off at any point along the length of the track which can be invaluable for powering flood lights, drag lines for dragging tree trunks, power saws and fire fighting apparatus.

I claim:

1. A track for providing combined electric current and frictional traction for a suspended locomotive, comprising:
    an elongate resilient shield,
    at least one elongate conductor positioned within said shield,
    a plurality of contact segments along the length of said shield, said segments extending from within said shield to the exterior of said shield and being normally spaced from said conductor within said shield,
    at least one flexible elongate reinforcing member connected to said shield for supporting said track,
    said at least one flexible elongate reinforcing member having a first exterior surface adapted to engage at least one reaction wheel of a locomotive,
    said shield and said contact segments forming a second exterior surface adapted to be frictionally engaged by at least one drive wheel of the locomotive,
    said first and second surfaces being on opposed sides of said track,
    the zone of said track which is engaged by the reaction wheel and drive wheel of the locomotive compressing by deformation of said shield to cause the ones of said contact segments in said zone to engage said conductor to provide electricity to the locomotive,
    said compression of said track and resilient shield causing substantial frictional engagement between said second exterior surface and the drive wheel of the locomotive to provide frictional engagement that drives the locomotive, through the drive wheel, along said second exterior surface.

2. The track of claim 1 wherein said first exterior surface provides an upper surface of said track and said second exterior surface provides a lower surface of said track.

3. The track of claim 2 wherein the uncompressed distance between said first exterior surface and said second exterior surface is substantially greater than the distance between the reaction wheel and drive wheel of the locomotive.

4. The track of claim 1 wherein the uncompressed distance between said first exterior surface and said second exterior surface is substantially greater than the distance between the reaction wheel and drive wheel of the locomotive.

5. The track of claim 1 wherein said reinforcing member comprises two stranded metallic cables extending side by side along the length of said track and at least partially embedded in said shield.

6. The track of claim 5 wherein the upper surface of said reinforcing cables constitutes said first exterior surface.

7. The track of claim 6 further comprising spaced connectors connecting the two cables together and constituting securement means by which the track may be suspended.

8. The track of claim 1 wherein said reinforcing member comprises two hollow segmental metal cables extending side by side along the length of said track and at least partially embedded in said shield, each cable comprising a plurality of interlocking helical segments affording interlocking projections and recesses which permit relative peripheral movement and thus longitudinal bending of the cables.

9. The track of claim 8 wherein the upper surface of said reinforcing cables constitutes said first exterior surface.

10. The track of claim 8 further comprising spaced connectors connecting the two cables together and constituting securement means by which the track may be suspended.

* * * * *